UNITED STATES PATENT OFFICE.

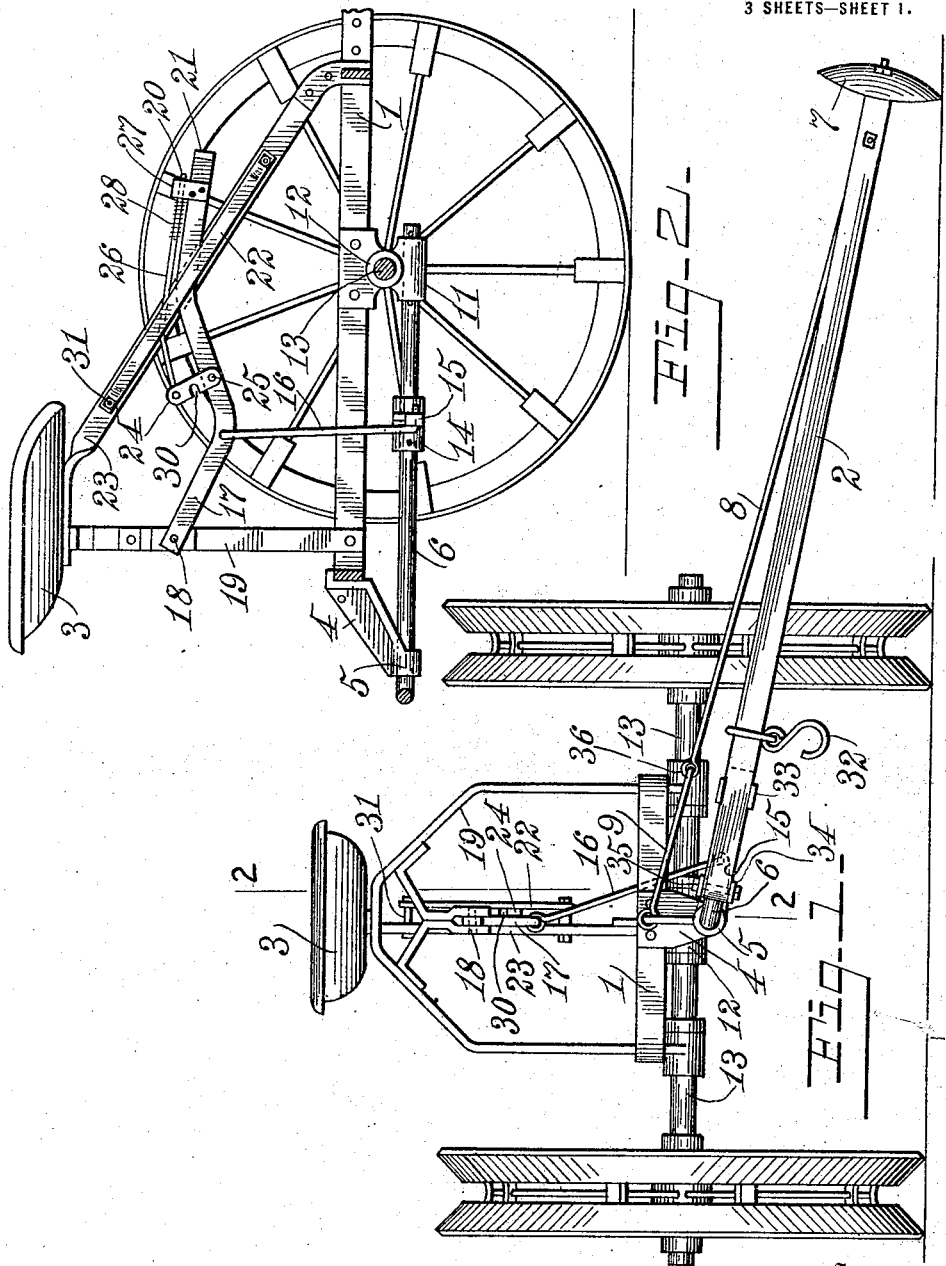

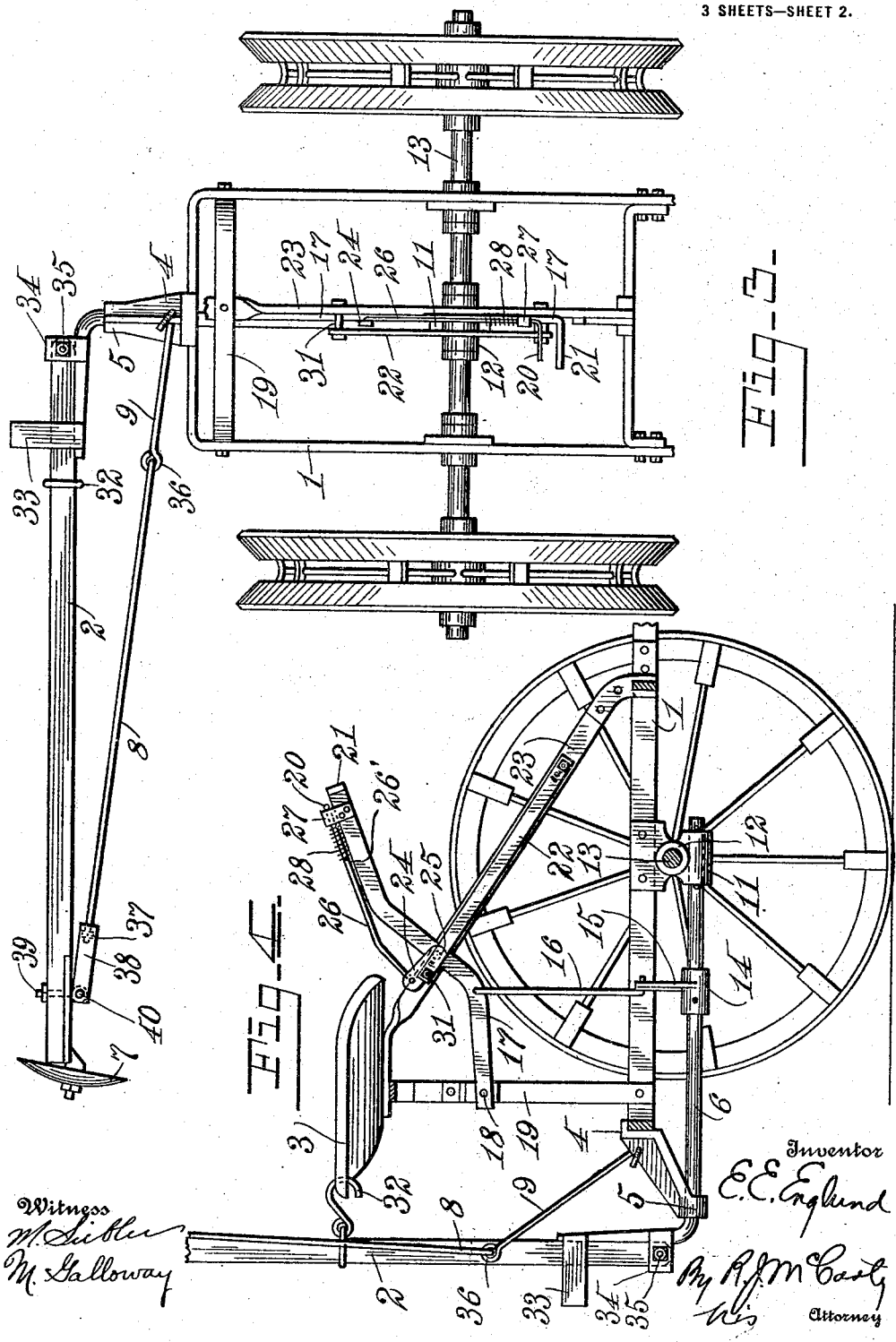

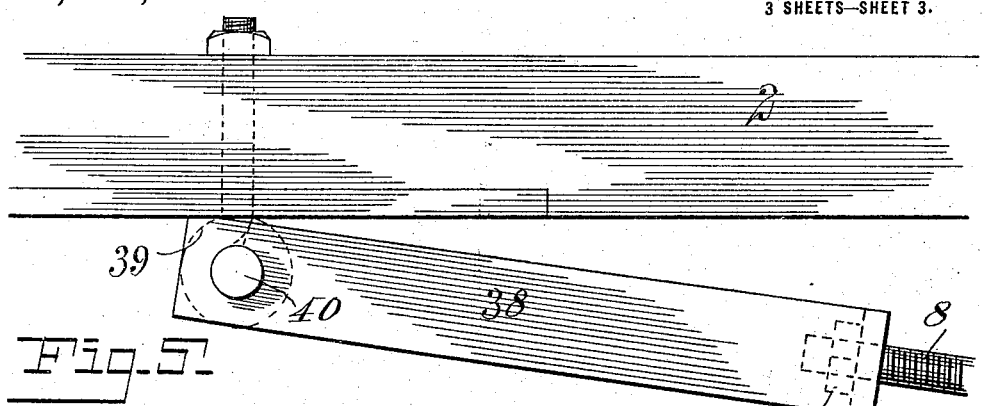

ERNST E. ENGLUND, OF MOLINE, ILLINOIS, ASSIGNOR TO D. M. SECHLER IMPLEMENT & CARRIAGE CO., OF MOLINE, ILLINOIS.

CORN-PLANTER.

1,211,365.  Specification of Letters Patent.  Patented Jan. 2, 1917.

Application filed July 19, 1916. Serial No. 110,026.

*To all whom it may concern:*

Be it known that I, ERNST E. ENGLUND, a citizen of the United States, residing at Moline, in the county of Rock Island and State of Illinois, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in corn planters or machines having a capacity for planting various seeds in rows.

The improvements relate more specifically to the marker and the means for manipulating the same or elevating and lowering it without the operator being required to dismount from the machine.

The purpose of a marker is well known. It marks the soil as the machine is driven back and forth through the field and serves as a guide for the driver in returning to mark the next row. In planting back and forth across the field, it is well known that the marker must be shifted to opposite sides of the machine in driving in opposite directions. It, therefore, becomes necessary at the end of each row to change the position of the marker from one side of the machine to the other. This has been done heretofore, so far as I am aware, by the driver dismounting or getting off of the machine and lifting the marker bar from one side to the other at the end of each row. This method of manipulating the marker bar is troublesome and requires the driver to lose more or less time in stopping the machine and getting off thereof.

It is, therefore, the object of this invention to provide certain means, hereinafter described, whereby the marker may be manipulated by the driver without requiring the latter to dismount or leave the machine, as will hereinafter more fully appear from the following description in connection with the accompanying drawings.

A further object of the invention is to provide means for preventing a breakage of the marker bar in case the marker disk should come in contact with an obstruction, such as a stone, stump or bank of earth or fall into a hole or dead furrow, as will more fully appear from the description to follow.

In the accompanying drawings, Figure 1 is a rear elevation of a well known type of corn planter having various parts not involved in the present invention omitted; Fig. 2 is an elevation on the line 2—2 of Fig. 1; Fig. 3 is a top plan view of the machine as shown in Fig. 1; Fig. 4 is a view similar to Fig. 2 with the marker bar elevated; Figs. 5 and 6 are detail views of the breakable joint connecting the marker bar with the brace-rod; Figs. 7 and 8 are detail views showing a modification of the joint; Figs. 9 and 10 are detail views of the pivot or hinge of the marker bar.

In a detail description of the invention as illustrated, similar reference characters indicate corresponding parts.

Referring more in detail to the accompanying drawings, 1 designates well known parts of the frame of a planter mounted on tractors and upon which are mounted the various elements comprised in the present improvements. These consist in the marker disk 7, the marker bar 2 and means connected with it for manipulating the same from the driver's seat 3. At the rear part of the frame 1 and substantially in a central position, a bracket 4 is rigidly attached. This bracket 4 has a downwardly projected bearing portion 5 which forms the rearmost bearing for a rock shaft 6 to which the marker bar 2 is rigidly attached. The shaft 6 or that portion thereof which supports the marker bar lies at a right angle to the portion of said shaft which enters the bearing 5. Said shaft 6 has attached to its flattened portion two U-shaped clips 33 and 34 the first named being the longer of the two. The end of the marker bar is pivoted on a bolt 35 in the clip 34 which clip as shown in the drawings is at the end of the bar. The purpose of having clip 33 longer than clip 34 is to limit the movement of the marker bar and prevent it from falling out of said clip when said marker bar is elevated and the brace rod is slackened. On the end of the marker bar 2 the rotating marker disk 7 is suitably mounted.

The brace rod consists of two parts 8 and 9 which are loosely connected at 36. The short portion 9 is suitably connected to the bearing 4 to insure flexibility. The outer end of portion 8 of said brace rod is threaded and provided with a nut 37 which is seated in the closed end of a U-shaped clip 38, or the end of said clip 38 might be threaded to receive said threaded end of the rod and the nut 37 be dispensed with. The free end of the clip 38 is connected to the eye of an eye-bolt 39 by means of an easily broken pin 40 which may be constructed of wood or any weak or brittle metal. Owing to these features, should the marker disk 7 or any part of the bar 2 come in contact with any obstruction, the pin 40 will break or give way and release said marker bar and allow it to swing backward thus preventing breakage thereof. In the drawings, I have shown other means for releasing the marker bar in case the marker disk should strike an obstruction as indicated above. This latter means consists of a spring-controlled device. In Figs. 7 and 8 it is shown to consist of two jaws 41 and 42. One of these jaws is an integral part of the outer end of a turn-buckle member 44 and the other jaw is pivoted thereto at 43. The ends of the jaws beyond the pivot 43 are shaped to form an eye 45 to receive the eye end of the bolt 39. A helical spring 46 is secured between the ends of the jaws and exerts a normal force to close said jaws. Any force exerted on the marker bar due to the marker disk striking an obstruction will cause the jaws 41 and 42 to spread and release the bolt 39, thus breaking the joint and releasing the marker bar. The end of the turn-buckle 44 opposite the jaws is provided with a screw-threaded boss 47 which receives the end of the brace-rod 8. It will be understood that when the marker bar is elevated, the rod yields at the joint formed between the two parts thereof, and when lowered said brace-rod straightens out in a well known manner.

The usual method of supporting the outer end of a marker bar is by means of a rope or wire fastened at some point of said bar and to tie the other end of said marker bar to some convenient part of the planter frame. In the use of the flexible brace-rod consisting of the parts 8 and 9, such rope or wire is necessarily dispensed with and the inconvenience hitherto experienced in the manipulation of the marker is avoided.

The rock shaft 6 to which the marker bar is pivoted is provided at its forward end with a bearing 11 formed in the lower portion of a bearing 12 which is one of the bearings for the main planter axle 13. The said rock shaft 6, at a suitable point between its bearings 5 and 11, has fixed to it a collar 14 from which a crank arm 15 projects and connects with a link 16 which in turn is coupled with a hand-operative lever 17 at a suitable point. The lever 17 is pivoted at 18 to a suitable part of the frame work of the planter such, for example, as the arch 19 which supports the driver's seat 3. The hand lever 17 has its outer end provided with a suitable hand-grip 21 and said lever 17 is workable within a guide 22, the ends of which are suitably attached as by bolts to a side of the seat brace 23 which extends from the frame proper of the machine to the seat. It will be seen that in raising the hand lever 17 to the extent of the guide 22, the rock shaft 6 will be turned and the marker bar 2 will be elevated, as shown in Fig. 4. A depression of the hand lever 17 will in a similar manner lower the marker bar to the operating position. The said marker bar may be held in the elevated position temporarily, for example, in turning from one row to another, by means of a detent or latch 24 one end of which is pivoted at 25 to the lever 17 and the other end of which is pivoted to a rod 26 which lies parallel with the lever 17 and has an end passed freely through a support or bracket 27 which is rigidly attached to the outer end of said lever 17. The rod 26 terminates at its outer end in a hand-grip portion 20. An expansion spring 28 surrounds the outer end of the rod 26 and is confined between the bracket 27 and a shoulder or pin 26' on the rod 26 so that the expansion of the spring has a tendency to move the latch 24 rearwardly upon its pivot 25. The said latch is provided with a notch 30 which is adapted to receive the upper bolt 31 which unites the upper end of the guide 22 to the seat brace 23.

In elevating the marker bar 2 from the position shown in Figs. 1 and 2, the operator grasps the hand-grip 21 of the lever 17 and lifts the same and therewith the rod 26 through the guide 22 and at the same time presses forward the rod 26 by engaging the forward end 20 thereof to move the latch 24 forward against the tension of the spring 28 to a position to pass up through the guide 22 and to snap over the bolt 31 when the lever 17 is elevated to the limit of its movement, as shown in Fig. 4. In lowering the lever 17 to place the marker bar in an operating position, the rod 26 is in a similar manner moved against the tension of the spring 28 to free the latch from the bolt 31. In driving the machine from one field to another or in moving it to distant points, the marker bar 2 may be held in an upright position and the latch 24 and parts coöperating therewith relieved of any strain, by means of a hook 32 which is suitably connected to the marker bar and adapted to hook into an opening in the rear of the seat 3.

Having described my invention, I claim:
1. In a machine of the character described, a marker bar, a rock shaft having bearings in the frame of said machine and to which said marker bar is pivotally connected, means for limiting the movement of the marker bar when swinging it upon its pivot from one position to another, a marker disk pivoted to said marker bar, a flexible brace-rod for said marker bar, and a connection between said brace-rod and the marker bar of a character to yield in the event the disk or marker bar meets with an obstruction in the operations thereof, whereby the marker bar is prevented from breakage.

2. In a machine of the character specified, a planter frame, a marker bar having a marker disk pivoted thereto, a shaft to which said marker bar has a pivotal connection, means on said shaft and engaging the marker bar to prevent said bar from swinging too far on its pivot when being moved to an elevated position, and a flexible brace-rod one end of which is united to the marker bar by a breakable connection whereby the marker bar will be released from the brace-rod when the movement of said marker bar is resisted by an obstruction.

In testimony whereof I affix my signature, in presence of two witnesses.

ERNST E. ENGLUND.

Witnesses:
O. M. STOWE,
A. M. KNUDSEN.

Copies of this patent may be obtained for five cents each, by addressing the "Commissioner of Patents, Washington, D. C."